(12) United States Patent
Joo et al.

(10) Patent No.: US 10,460,645 B2
(45) Date of Patent: Oct. 29, 2019

(54) POWER SUPPLYING SYSTEM AND POWER MODULE

(71) Applicant: SAMSUNG ELECTRONICS CO., LTD., Suwon-si (KR)

(72) Inventors: Sung-yong Joo, Hwaseong-si (KR); Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 15/450,109

(22) Filed: Mar. 6, 2017

(65) Prior Publication Data

US 2017/0287382 A1    Oct. 5, 2017

(30) Foreign Application Priority Data

Apr. 1, 2016    (KR) .................... 10-2016-0040396

(51) Int. Cl.
| | | |
|---|---|---|
| *G06F 1/00* | (2006.01) | |
| *G09G 3/20* | (2006.01) | |
| *H01R 24/60* | (2011.01) | |
| *H02M 3/04* | (2006.01) | |
| *H02M 7/04* | (2006.01) | |
| *G06F 1/16* | (2006.01) | |
| *G06F 1/26* | (2006.01) | |
| *H01R 107/00* | (2006.01) | |

(52) U.S. Cl.
CPC ......... *G09G 3/2092* (2013.01); *G06F 1/1632* (2013.01); *G06F 1/26* (2013.01); *H01R 24/60* (2013.01); *H02M 3/04* (2013.01); *H02M 7/04* (2013.01); *G09G 2330/021* (2013.01); *H01R 2107/00* (2013.01)

(58) Field of Classification Search
CPC ........................................................ G06F 1/32
See application file for complete search history.

(56) References Cited

U.S. PATENT DOCUMENTS

| | | | |
|---|---|---|---|
| 8,674,558 B2 | 3/2014 | De Iuliis et al. | |
| 9,106,037 B2 | 8/2015 | Lee et al. | |
| 2002/0180277 A1* | 12/2002 | Acharya | ............... G06F 1/1626 307/140 |
| 2004/0037102 A1 | 2/2004 | McDonald et al. | |
| 2008/0211310 A1* | 9/2008 | Jitaru | ................... H01R 31/065 307/72 |

(Continued)

FOREIGN PATENT DOCUMENTS

KR    1020040072611 A    8/2004

OTHER PUBLICATIONS

Sean Hollister, "Your Next Laptop Could Have the Holy Grail of USB Ports", Retrieved from http://gizmodo.com/your-next-laptop-could-have-the-holy-grail-of-usb-ports-1637772167, Sep. 22, 2014, Total 3 pages.

*Primary Examiner* — Mohammed H Rehman
(74) *Attorney, Agent, or Firm* — Sughrue Mion, PLLC (57) ABSTRACT

A power supplying system and a power module are provided. The power supplying system includes a power supplying apparatus configured to supply power to a display apparatus, and process an image signal received from outside and transmit the processed image signal to the display apparatus, and a power module configured to supply power to an external apparatus, wherein the power module is configured to be docked with the power supplying apparatus.

7 Claims, 11 Drawing Sheets

(56) References Cited

U.S. PATENT DOCUMENTS

| | | |
|---|---|---|
| 2011/0211177 A1 | 9/2011 | Lee et al. |
| 2013/0187459 A1 | 7/2013 | Green |
| 2014/0136749 A1* | 5/2014 | North .................. G06F 13/4022 710/313 |
| 2014/0339895 A1 | 11/2014 | Miklitsch |
| 2014/0342669 A1 | 11/2014 | Zeung et al. |
| 2015/0269102 A1 | 9/2015 | Inha et al. |
| 2016/0127135 A1* | 5/2016 | Balasubramanian ... H04L 12/10 713/300 |
| 2017/0255242 A1* | 9/2017 | Halpern ................... H02J 1/10 |

* cited by examiner

POWER SUPPLYING SYSTEM AND POWER MODULE

CROSS-REFERENCE TO RELATED APPLICATION

This application claims priority from Korean Patent Application No. 10-2016-0040396, filed on Apr. 1, 2016, in the Korean Intellectual Property Office, the disclosure of which is incorporated herein by reference in its entirety.

BACKGROUND

1. Field

Apparatuses and methods consistent with exemplary embodiments relate to a power supplying system and a power module, and more particularly, to a power supplying system and a power module for connection to an apparatus connected in a universal serial bus (USB) Type-C.

2. Description of the Related Art

In accordance with implementation of ultra-slim display apparatuses having a thickness in a several-millimeter unit, a method of performing power supplying and image processing functions in an apparatus separately provided outside the ultra-slim display apparatuses has been suggested. In addition, a peripheral device for performing mirroring, or the like, to the display apparatus may also receive power from a separately provided power supplying apparatus.

However, when the peripheral device is connected to the power supply apparatus through a universal serial bus (USB) Type-C connector, a product should be designed in consideration of transmission of power for a USB Type-C. In an existing USB Type-A, power transmission is about 10 W, and thus, a product does not need to be designed in consideration of the power transmission. However, in the case of the USB Type-C, power transmission may be up to 100 W, and thus, a structure for the power transmission should be reflected in designing the product. Therefore, a cost required for manufacturing the power supply apparatus has increased.

In addition, users that do not use a peripheral device supporting the USB Type-C should purchase a power supply apparatus that is expensive and has a large size due to an unnecessary function.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a power supplying system and a power module capable of being connected to an external apparatus supporting a USB Type-C through separate modularization.

One or more exemplary embodiments provide a power module that may supply power to Type-C peripheral devices and may be attached to and be detached from a power supplying apparatus, such that additional functions may be selectively supported to only users of the Type-C peripheral devices.

According to an aspect of an exemplary embodiment, there is provided a power supplying system including: a power supplying apparatus configured to supply power to a display apparatus, and process an image signal received from outside and transmit the processed image signal to the display apparatus; and a power module configured to supply power to an external apparatus, wherein the power module is configured to be docked with the power supplying apparatus.

According to an aspect of another exemplary embodiment, there is provided a power module docked with a power supplying apparatus including: a power input configured to receive power from the power supplying apparatus; and a second connector configured to supply power to an external apparatus.

BRIEF DESCRIPTION OF THE DRAWINGS

The above and/or other aspects will be more apparent by describing in detail exemplary embodiments with reference to the accompanying drawings, in which.

DETAILED DESCRIPTION OF THE EXEMPLARY EMBODIMENTS

Hereinafter, exemplary embodiments will be described in detail with reference to the accompanying drawings. In the following description, when it is decided that a detailed description for the known functions or configurations may obscure the gist of the inventive concept, the detailed description therefore will be omitted. In addition, terms to be described below are defined in consideration of functions in the exemplary embodiments, and may be construed in different ways by users, operators, practices, or the like. Therefore, the definitions thereof should be construed based on the contents throughout the specification.

Terms 'first', 'second', and the like, may be used to describe various components. However, these components are not limited by these terms. The terms are used only to distinguish one component from another component. For example, a 'first' component may be named as a 'second' component, and similarly, the 'second' component may be named as the 'first' component, without departing from the scope of the present disclosure. A term 'and/or' may include a combination of a plurality of related items or any one of the plurality of related items.

Terms and expressions used throughout the disclosure are to describe exemplary embodiments, and are not intended to restrict and/or limit the present disclosure. Singular forms encompass plural forms unless clearly interpreted otherwise in a context. It will be further understood that the terms "include" or "have" used herein specify the presence of features, numerals, steps, operations, components, parts, or a combination thereof, but not to preclude possibility of presence or addition of one or more other features, numerals, steps, operations, components, parts, or a combination thereof.

Figure 1:
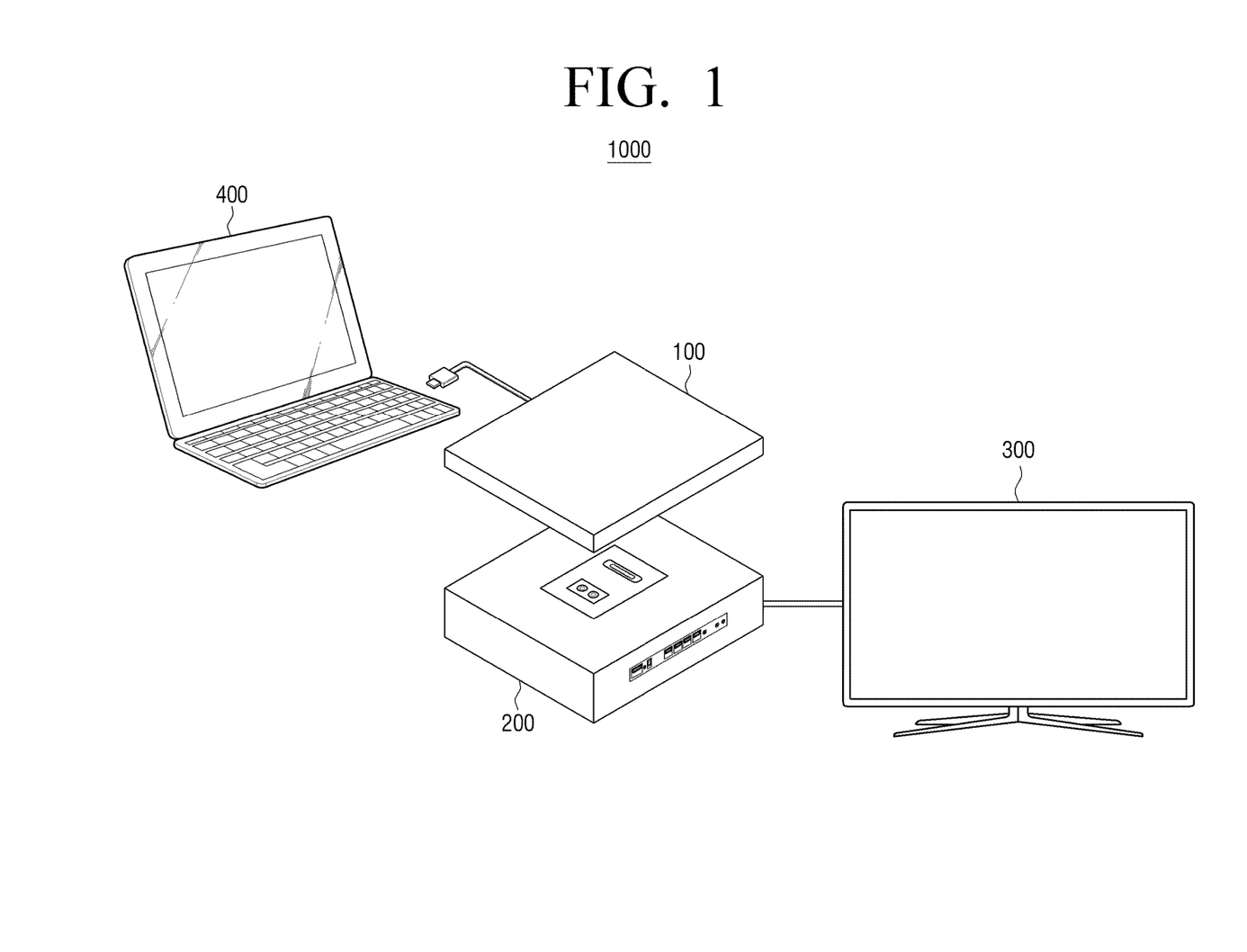
FIG. 1 is a conceptual diagram illustrating a power supplying system according to an exemplary embodiment.

FIG. 1 is a conceptual diagram illustrating a power supplying system 1000 according to an exemplary embodiment. Referring to FIG. 1, the power supplying system 1000 may include a power module 100 and a power supplying apparatus 200. The power module 100 and the power supplying apparatus 200 may be docked with each other. The power module 100 may be connected to an external apparatus 400, and the power supplying apparatus 200 may be connected to a display apparatus 300. Because the power supplying system 1000 supplies power to both of the display apparatus 300 and the external apparatus 400 connected thereto, the display apparatus 300 and the external apparatus 400 do not need to include a power supply in themselves.

The power module 100 may be connected to the power supplying apparatus 200 and the external apparatus 400 through universal serial bus (USB) Type-C connectors. The power module 100 may receive power from the power supplying apparatus 200, and supply the power to the external apparatus 400. In addition, the power module 100 may transmit and receive at least one of an image signal and data to and from the external apparatus 400. In addition, the power module 100 may transmit the received image signal, or the like, to the power supplying apparatus 200.

The power supplying apparatus 200 may be connected to the display apparatus 300 to supply power to the display apparatus 300. In addition, the power supplying apparatus 200 may process an image signal received from the outside, and transmit the processed image signal to the display apparatus 300. For example, the power supplying apparatus 200 may decode an image having a resolution of 4K, and transmit the decoded image to the display apparatus 300.

The display apparatus 300 may receive the image signal from the power supplying apparatus 200, and display the received image signal. The display apparatus 300 may be operated by power and a control signal provided from the power supplying apparatus 200. For example, the display apparatus 300 may be implemented by a smart television (TV), a monitor, or the like.

The external apparatus 400 may be an electronic apparatus supporting USB Type-C connection. For example, the external apparatus 400 may be implemented by various types of apparatuses such as a personal computer (PC), a laptop computer, a tablet PC, a set top box, and the like.

In the power supplying system 1000 according to an exemplary embodiment, the power module 100 for connecting peripheral devices supporting the USB Type-C to the power supplying apparatus 200 and the display apparatus 300 may be separately provided. Therefore, only in the case of using the Type-C peripheral devices, the power module 100 may be docked to the power supplying apparatus 200 to supply the power to the Type-C peripheral devices and transmit and receive the image signal.

Hereinafter, the power module 100 and the power supplying apparatus 200 configuring the power supplying system 1000 will be described in more detail.

Figure 2:
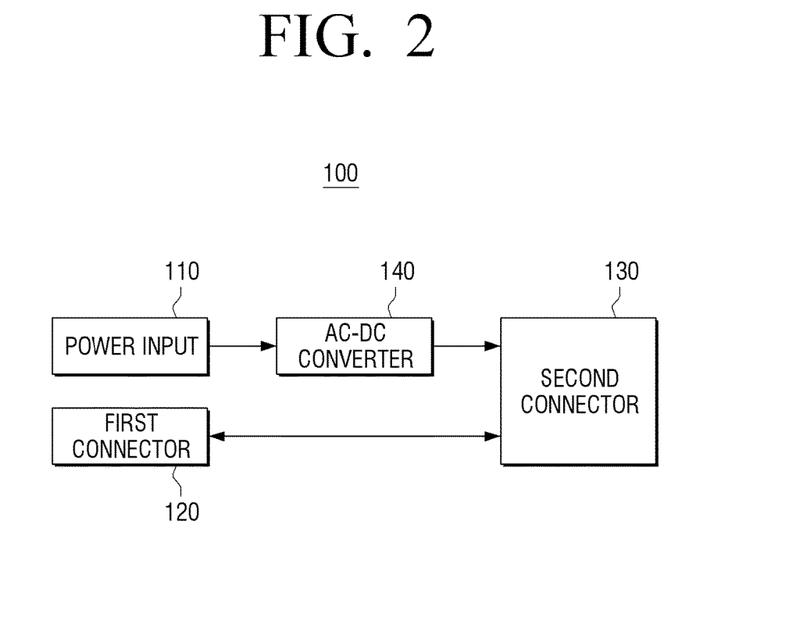
FIG. 2 is a block diagram for describing a configuration of a power module according to an exemplary embodiment.
Figure 5:
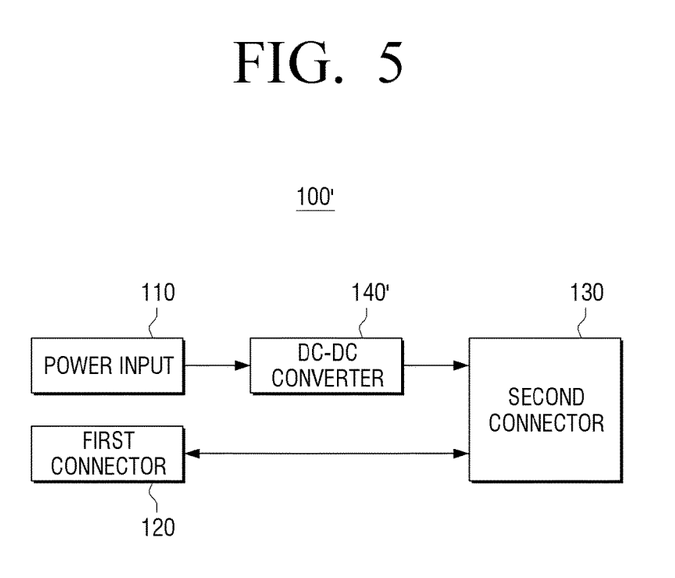
FIG. 5 is a block diagram for describing a configuration of a power module according to another exemplary embodiment.

FIG. 2 is a block diagram for describing a configuration of a power module 100 according to an exemplary embodiment. Referring to FIG. 2, the power module 100 may include a power input 110, a first connector 120, a second connector 130, and an alternating current (AC)-direct current (DC) converter 140. The power module 100 is not limited thereto, but may also include a DC-DC converter, as illustrated in FIG. 5.

The power input 110 is a component for receiving the power from the power supplying apparatus 200. The power input 110 may receive AC power or DC power from the power supplying apparatus 200. In an exemplary embodiment of FIG. 2, the power input 110 may receive the AC power from the power supplying apparatus 200.

The first connector 120 is a component for performing transmission and reception of data to and from the power supplying apparatus 200. For example, the first connector 120 may be implemented by a USB Type-C connector. The power module 100 may transmit an image signal, data, a control signal, and the like, to the power supplying apparatus 200 through the first connector 120.

The second connector 130 is a component for supplying the power to the external apparatus 400 and performing transmission and reception of data to and from the external apparatus 400. For example, the second connector 130 may be implemented by a USB Type-C connector. The power module 100 may supply the power to the external apparatus 400 through the second connector 130. The power supplied to the external apparatus 400 may be power converted into DC power through the AC-DC converter 140. In addition, the power module 100 may receive an image signal, data, and the like, from the external apparatus 400 through the second connector 130.

The AC-DC converter 140 may convert input AC power into the DC power. For example, the AC-DC converter 140 may convert the AC power input from the power supplying apparatus 200 through the power input 110 into the DC power. The AC-DC converter 140 may output the converted DC power to the second connector 130.

That is, the power module 100 according to an exemplary embodiment may receive the power from the power supplying apparatus 200, convert the received power, and provide the converted power to the external apparatus 400. In addition, the power module 100 may receive the data including the image signal from the external apparatus 400, and transmit the received image signal, and the like, to the power supplying apparatus 200.

Figure 3:
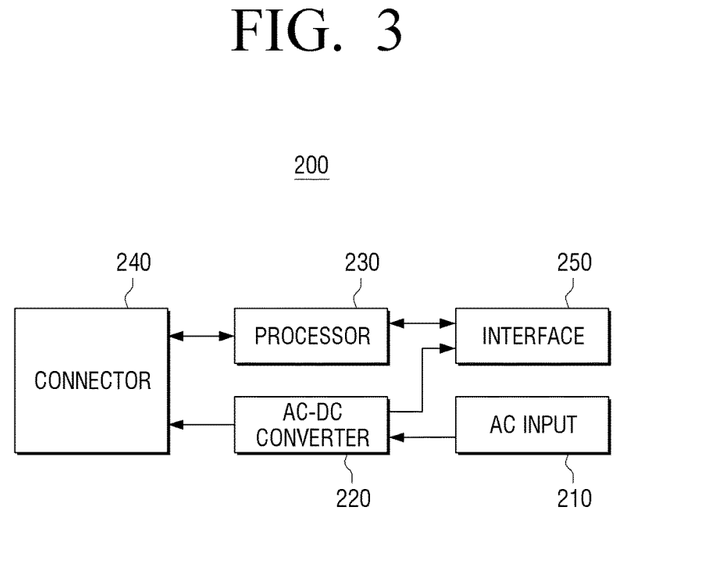
FIG. 3 is a block diagram for describing a configuration of a power supplying apparatus according to an exemplary embodiment.

FIG. 3 is a block diagram for describing a configuration of a power supplying apparatus 200 according to an exemplary embodiment. Referring to FIG. 3, the power supplying apparatus may include an AC input 210, an AC-DC converter 200, a processor 230, a connector 240, and an interface 250. The power supplying apparatus 200 may further include a tuner (not illustrated) for processing a broadcasting signal, and the like, in addition to the components illustrated in FIG. 3.

The AC input 210 may receive AC power, and supply the power to the respective components of the power supplying apparatus 200. For example, the AC input 210 may be implemented by a switched-mode power supply (SMPS). The SMPS refers to a power supply including a switching regulator. The SMPS has an advantage that a size and a weight of a transformer may be decreased as compared with a linear power supply.

The AC-DC converter 220 may receive the AC power from the AC input 210, convert the AC power into DC power, and output the DC power. For example, the AC-DC converter 220 may convert the AC power into the DC power through a circuit configuration using a switching element. As a circuit configuration scheme, various exemplary embodiments such as a half bridge scheme, a full bridge scheme, a fly back scheme, a forward scheme, a push pull scheme, and the like, may be used.

The processor 230 may control a general configuration of the power supplying apparatus 200. In addition, the processor 230 may control the display apparatus 300 connected to the power supplying apparatus 200. The processor 230 may be implemented in a form of a control board including a central processing unit (CPU), a graphics processing unit (GPU), an image processing unit (IPU), a memory, and the like. In addition, the processor 230 may process an image signal. The processor 230 may perform various kinds of image processing such as a decoding, a scaling, a noise filtering, a frame rate converting, a resolution converting, and the like, on image data. For example, the processor 230 may perform decoding on an image signal having a resolution that is not supported by the display apparatus 300 connected to the power supplying apparatus 200, and transmit image-processed data to the display apparatus 300.

The connector 240 is a component for being docked with the power module 100 to supply power to the power module 100 and transmit and receive a signal and data to and from the power module 100. The connector 240 may have a shape corresponding to those of the power input 110 and the first connector 120 of the power module 100. The connector 240 may be disposed at a position corresponding to those of the power input 110 and the first connector 120, and allow the power module 100 and the power supplying apparatus 200 to be fitted into and coupled to each other.

The interface 250 is a component for being connected to the display apparatus 300 to supply power to the display apparatus 300 and transmit and receive a signal and data to and from the display apparatus 300.

The tuner (not illustrated) may convert the broadcasting signal into a transport stream (TS) signal that may be digitally processed. The broadcasting signal may be a radio frequency (RF) signal. In addition, the broadcasting signal may be transmitted through a terrestrial, cable, or satellite broadcasting system.

Figure 4:
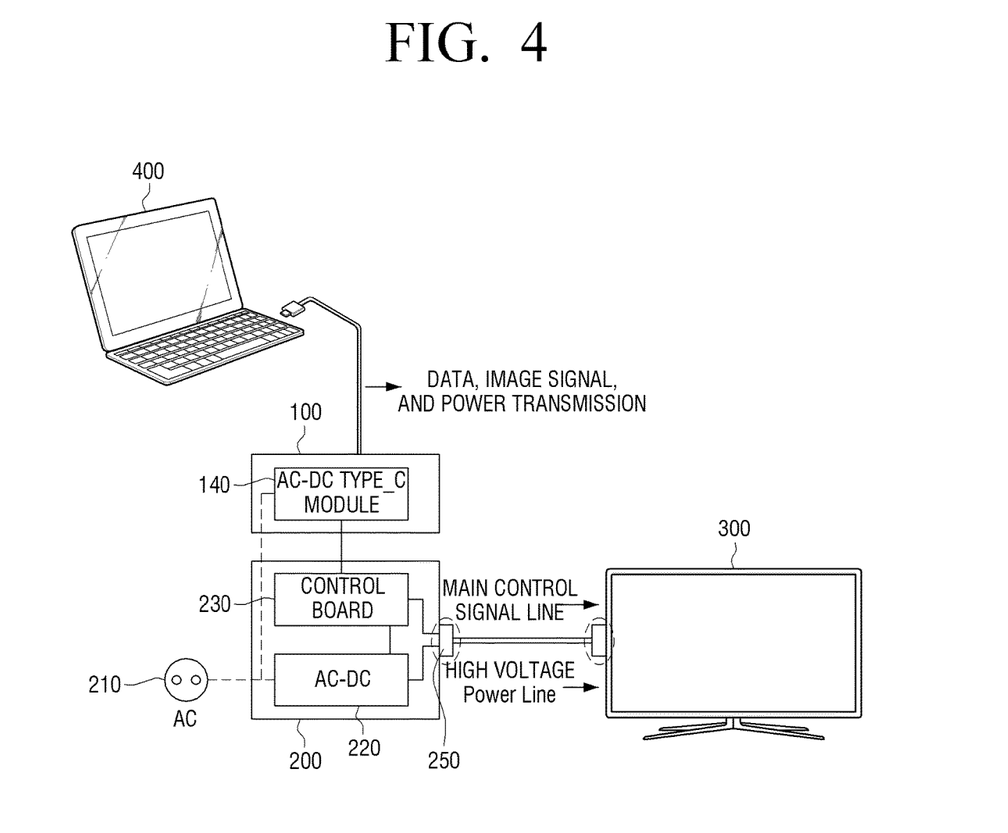
FIG. 4 is a view illustrating transfer paths of power and an image signal in the power supplying system according to an exemplary embodiment.

FIG. 4 is a view illustrating transfer paths of power and an image signal in the power supplying system 1000 according to an exemplary embodiment. In FIG. 4, a transfer path of power between the power module 100 and the power supplying apparatus 200 is denoted by a dotted line, and a transfer path of an image signal, data, and the like, between the power module 100 and the power supplying apparatus 200 is denoted by a solid line. In addition, in an exemplary embodiment of FIG. 4, the power module 100 includes the AC-DC converter 140.

The power may be transferred through the following processes. First, the AC power is input through the AC input 210 of the power supplying apparatus 200. In an exemplary embodiment of FIG. 4, the power module 100 includes the AC-DC converter 140, and thus, the AC power may bypass the AC-DC converter 220 of the power supplying apparatus 200, and may be input to the power input 110 of the power module 100 through the connector 240. The AC power input to the power input 110 may be converted into the DC power by the AC-DC converter 140, and may be transmitted to the external apparatus 400 through the second connector 130.

The image signal may be transferred through the following processes. Although the control signal, the data, and the like, may be transferred through the same processes as the processes of transferring the image signal, a description will be provided on the basis of the image signal. In an exemplary embodiment of FIG. 4, a case in which an image of the external apparatus 400 is transmitted or mirrored to the display apparatus 300 will be described.

Because the power module 100 is connected to the external apparatus 400 through the second connector 130 which is the USB Type-C connector, transmission and reception of data as well as transfer of power are possible. The power module 100 may receive the image signal from the external apparatus 400 through the second connector 130 and transmit the received image signal to the processor 230 of the power supplying apparatus 200 through the first connector 120. The processor 230 may perform image processing such as decoding, and the like, on the received image signal, and transmit the processed image signal to the display apparatus 300 through the interface 250.

FIG. 5 is a block diagram for describing a configuration of a power module 100' according to another exemplary embodiment. Referring to FIG. 5, the power module 100' may include a power input 110, a first connector 120, a second connector 130, and a DC-DC converter 140'. The power module 100' is different from the power module 100 illustrated in FIG. 2 in that it includes the AC-DC converter 140.

The DC-DC converter 140' may transform input DC power. The DC-DC converter 140' may transform the DC power input from the power supplying apparatus 200 through the power input 110. The DC-DC converter 140' may output the transformed DC power to the second connector 130. For example, the DC-DC converter 140' may be implemented by a boost converter circuit, or the like, and may boost the DC power input at 5V to 12V, 20V, or the like.

In an exemplary embodiment of FIG. 5, because the power module 100' receives the DC power from the power supplying apparatus 200, a power supply path is different from the path illustrated in FIG. 4.

Figure 6:
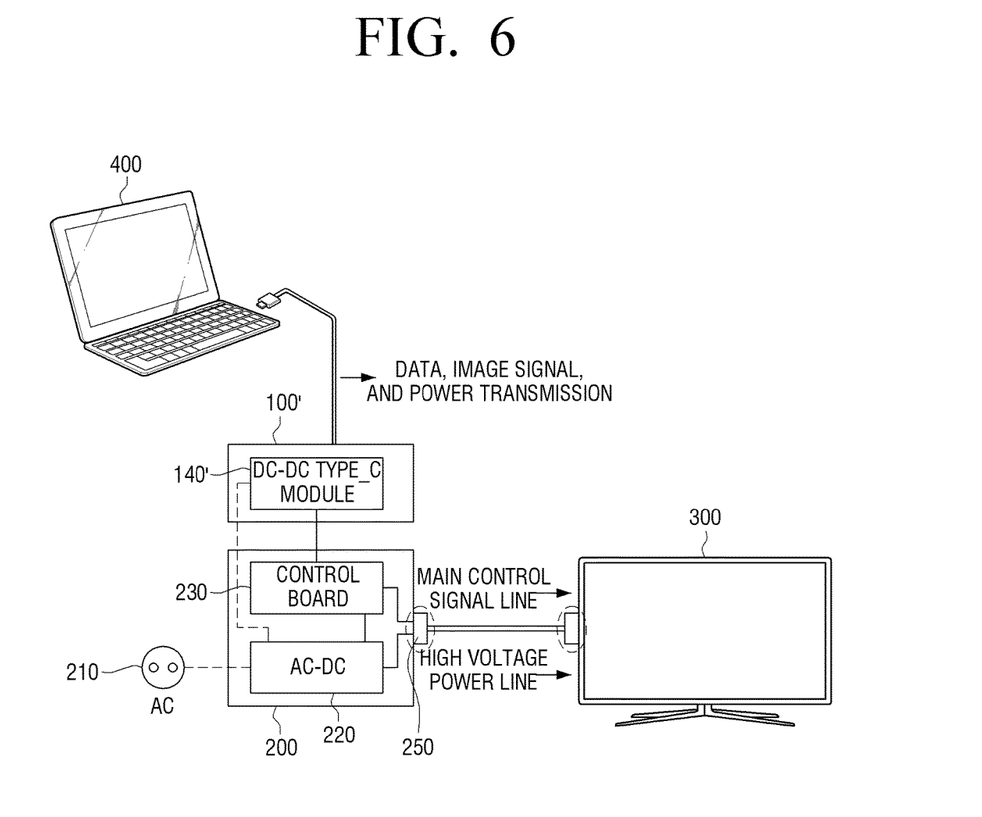
FIG. 6 is a view illustrating transfer paths of power and an image signal in the power module and a power supplying system according to another exemplary embodiment.

FIG. 6 is a view illustrating transfer paths of power and an image signal in the power module 100' and a power supplying apparatus 200 according to another exemplary embodiment o. In FIG. 6, a transfer path of power between the power module 100' and the power supplying apparatus 200 is denoted by a dotted line, and a transfer path of an image signal, data, and the like, between the power module 100' and the power supplying apparatus 200 is denoted by a solid line. Because the transfer path of the image signal in FIG. 6 is the same as that of FIG. 4, a description will be omitted in order to avoid an overlapping description, and only the transfer path of the power will be described.

The power may be transferred through the following processes. First, the AC power is input through the AC input 210 of the power supplying apparatus 200. In an exemplary embodiment of FIG. 6, because the power module 100' includes the DC-DC converter 140', the AC-DC converter 200 of the power supplying apparatus 200 first needs to convert the AC power into the DC power. The DC power input to the power input 110 may be transformed by the DC-DC converter 140', and may be transmitted to the external apparatus 400 through the second connector 130.

According to an exemplary embodiment, when the second connector 130 is connected to the external apparatus 400, the power module 100 may supply a preset first voltage to the external apparatus 400. For example, the preset first voltage may be 5V.

When voltage information is received from the external apparatus 400, the power module 100 may transmit DC power transformed into a voltage corresponding to the received voltage information to the external apparatus 400. For example, the voltage information may be profile information on required power demanded in the external apparatus 400. The external apparatus 400 using the USB Type-C connector may be divided into standard power profiles as represented in Table 1 depending on required power.

TABLE 1

Standard 5 power profile

| Profile 1 | 5 V @ 2 A | 10 W |
|---|---|---|
| Profile 2 | 5 V @ 2 A | 18 W |
|  | 12 V @ 1.5 A |  |
| Profile 3 | 5 V @ 2 A | 35 W |
|  | 12 V @ 3 A |  |
| Profile 4 | 5 V @ 2 A | 50 W |
|  | 12 V @ 3 A | (Limit for Micro-A/B) |
|  | 20 V @ 3 A |  |
| Profile 5 | 5 V @ 2 A | 100 W |
|  | 12 V @ 5 A | (Limit for Standard A/B) |
|  | 20 V @ 5 A |  |

For example, the power module 100 may receive feedback voltage information, boost a voltage of 5V to a voltage of 20V, and transmit power of 100 W to the external apparatus 400 through the second connector 130.

Figure 7:
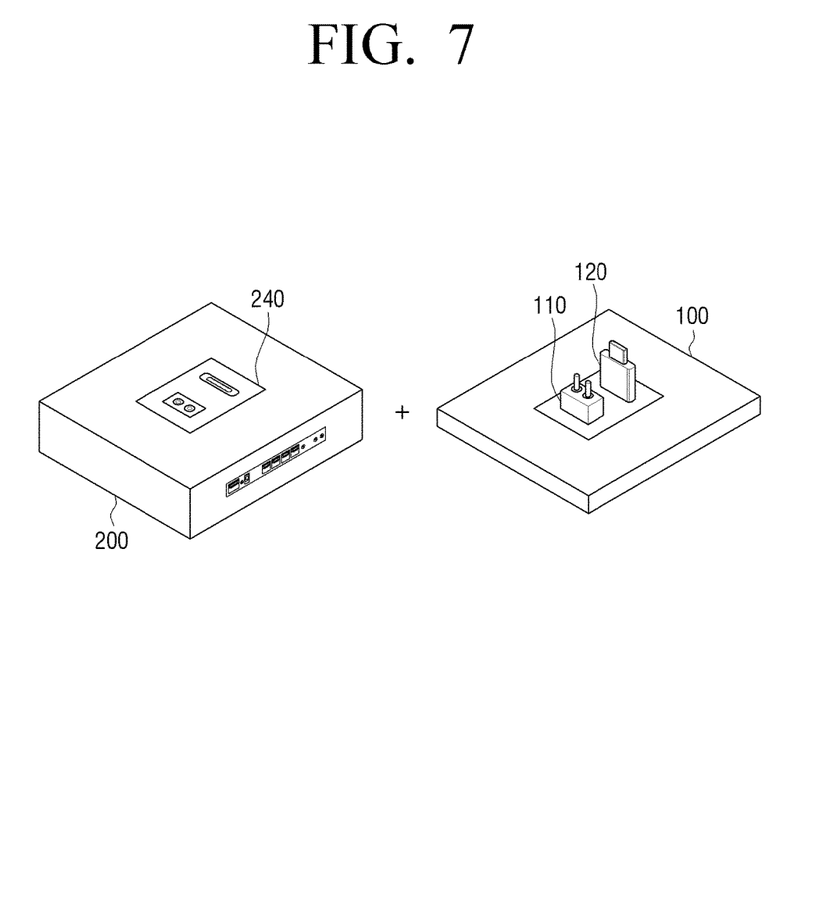
FIG. 7 is a view for describing a docking structure of the power module and the power supplying apparatus according to an exemplary embodiment.

FIG. 7 is a view for describing a docking structure of the power module 100 and the power supplying apparatus 200 according to an exemplary embodiment. For convenience of explanation, sizes and protrusion levels of the power input 110 and the first connector 120 of the power module 100 are exaggerated in FIG. 7.

The power input 110 and the first connector 120 may be disposed on the same plane of one side of the power module 100. For example, as illustrated in FIG. 7, the power input 110 and the first connector 120 may be disposed on a protrusion region positioned on a lower surface of the power module 100.

The connector 240 of the power supplying apparatus 200 may be disposed at a position corresponding to those of the power input 110 and the first connector 120. For example, as illustrated in FIG. 7, the connector 240 may be disposed on a groove region positioned in an upper surface of the power supplying apparatus 200. The connector 240 is fitted into and coupled to the power input 110 and the first connector 120, such that the power module 100 and the power supplying apparatus 200 may be docked with each other. Due to this structure, an additional cable for connecting the power module 100 and the power supplying apparatus 200 to each other, or the like, is not required.

Figure 8A:
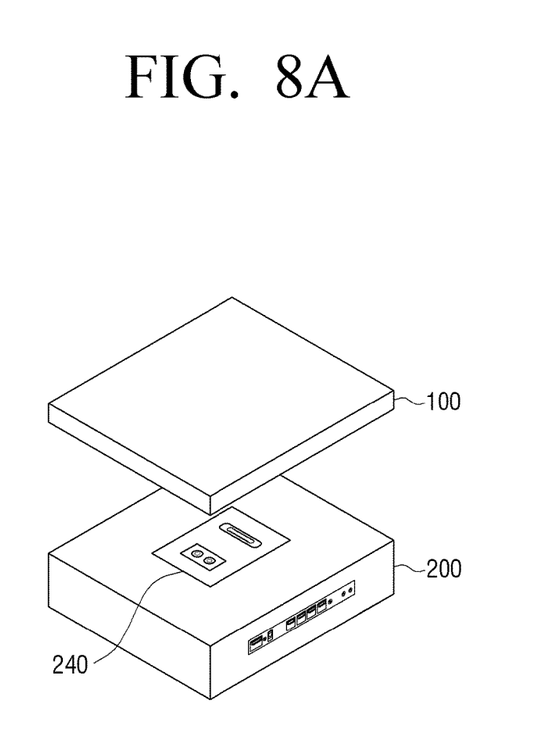
FIGS. 8A and 8B are conceptual diagrams illustrating forms of power modules and power supplying apparatuses according to various exemplary embodiments.
Figure 8B:
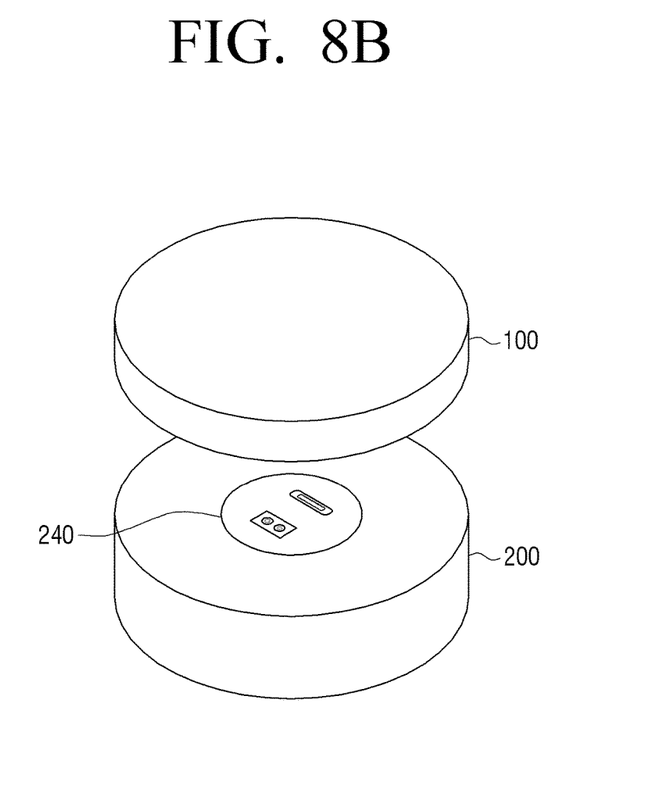

The power module 100 may be manufactured in a form corresponding to that of the power supplying apparatus 200 depending on an appearance of the power supplying apparatus 200. For example, the power module 100 may be implemented in a rectangular parallelepiped form as illustrated in FIG. 8A or may be implemented in a cylindrical form as illustrated in FIG. 8B. However, sizes of cases of the power module 100 and the power supplying apparatus 200 are not necessarily the same as each other, and the power module 100 may be implemented at a size smaller than that of the power supplying apparatus 200.

Although only an exemplary embodiment in which the power module 100 is docked with the upper surface of the power supplying apparatus 200 has been illustrated in FIGS. 7, 8A, and 8B has been illustrated, the power module 100 may also be docked with another surface such as a rear surface, left and right surfaces, or the like, of the power supplying apparatus 200. In addition, although only an exemplary embodiment in which the protrusion region is present in the power module 100 and the groove region is present in the power supplying apparatus 200, the protrusion region may be implemented to be present in the power supplying apparatus 200 and the groove region may be implemented to be present in the power module 100.

Figure 9A:
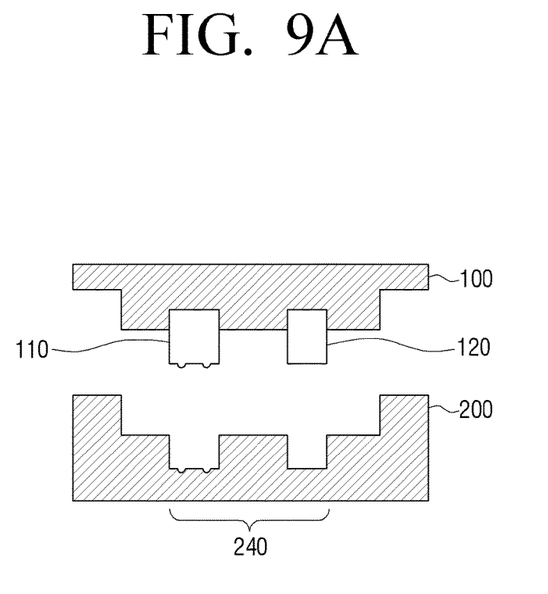
FIGS. 9A and 9B are cross-sectional views for describing docking structures of the power module and the power supplying apparatus according to various exemplary embodiments.
Figure 9B:
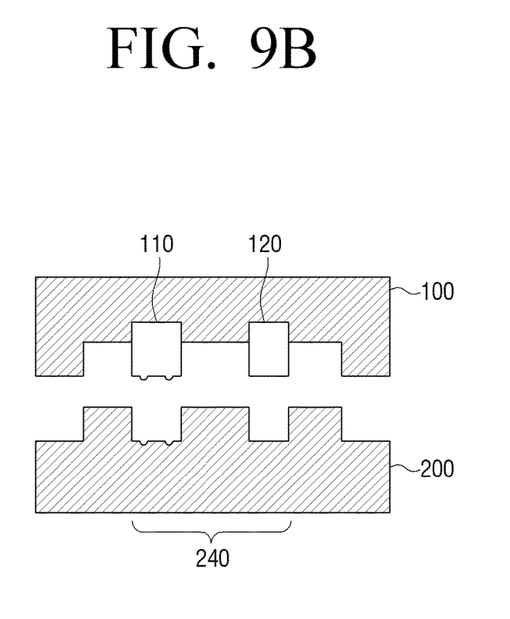

FIGS. 9A and 9B are cross-sectional views for describing docking structures of the power module 100 and the power supplying apparatus 200 according to various exemplary embodiments.

Referring to FIG. 9A, the protrusion region on which the power input 110 and the first connector 120 are disposed may be positioned on the lower surface of the power module 100. The groove region on which the connector 240 is disposed may be positioned on the upper surface of the power supplying apparatus 200, which is a position corresponding to the lower surface of the power module 100. The protrusion region and the groove region are fitted into and coupled to (or pressed and coupled to) each other, such that docking between the power module 100 and the power supplying apparatus 200 has stability.

Referring to FIG. 9B, the groove region on which the power input 110 and the first connector 120 are disposed may be positioned on the lower surface of the power module 100. Because the power input 110 and the first connector 120 are implemented in a form in which they protrude in the groove region, breakage of the power input 110 and the first connector 120 due to external impact, or the like, may be prevented. The protrusion region on which the connector 240 is disposed may be positioned on the upper surface of the power supplying apparatus 200, which is a position corresponding to the lower surface of the power module 100.

According to the various exemplary embodiments as described above, the separately modularized power module 100 for connection to the USB Type-C peripheral devices may be provided. A user may dock and use the power module 100 with the power supplying apparatus 200 only in the case in which the connection to the to the USB Type-C peripheral devices is required. The power module 100 for connection to the USB Type-C is implemented by a separate apparatus that may be docked, thereby making it possible to miniaturize the power supplying apparatus 200 and decrease a cost required for manufacturing the power supplying apparatus 200.

Although one or more exemplary embodiments have been illustrated and described, it will be appreciated by those skilled in the art that various changes in form and details may be made therein without departing from the spirit and scope of the exemplary embodiments as defined by the appended claims.

What is claimed is:

1. A signal processing system comprising:
   a sub apparatus; and
   a main apparatus configured to supply power to a display apparatus and the sub apparatus,
   wherein the sub apparatus is configured to supply power to an external apparatus based on information being received from the external apparatus, supply power transformed into a voltage corresponding to the information to the external apparatus,
   wherein the sub apparatus is configured to transmit an image signal, received from the external apparatus, to the main apparatus, and wherein the main apparatus is configured to decode the image signal and transmit the decoded image signal to the display apparatus.

2. The signal processing system as claimed in claim 1, wherein the sub apparatus comprises:
   a power input configured to receive power from the main apparatus; and
   a second connector configured to supply the power to the external apparatus.

3. The signal processing system as claimed in claim 2, wherein the sub apparatus further comprises a first connector configured to transmit the image signal to the main apparatus, and
   the sub apparatus is configured to receive the image signal from the external apparatus through the second connector and transmit the received image signal to the main apparatus through the first connector.

4. The signal processing system as claimed in claim 3, wherein the first connector and the second connector are universal serial bus (USB) Type-C connectors.

5. The signal processing system as claimed in claim 3, wherein the power input and the first connector are disposed on a protrusion region positioned on one side of the sub apparatus, and the main apparatus includes a groove region formed in one side thereof and a connector disposed at a position corresponding to those of the power input and the first connector on the groove region, the connector being fitted into and coupled to the power input and the first connector such that the main apparatus is docked with the sub apparatus.

6. The signal processing system as claimed in claim 2, wherein the sub apparatus further comprises an alternating current (AC)-direct current (DC) converter configured to convert AC power into DC power, and
   the sub apparatus is configured to receive the AC power from the main apparatus through the power input and supply the converted DC power to the external apparatus through the second connector.

7. The signal processing system as claimed in claim 2, wherein the sub apparatus further comprises a DC-DC converter configured to transform DC power, and
   the sub apparatus is configured to receive the DC power from the main apparatus through the power input and supply the transformed DC power to the external apparatus through the second connector.

* * * * *